United States Patent
Saito et al.

(10) Patent No.: US 8,049,349 B2
(45) Date of Patent: Nov. 1, 2011

(54) POWER GENERATION CONTROL DEVICE

(75) Inventors: Kenjiro Saito, Saitama (JP); Kousuke Tsunashima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 737 days.

(21) Appl. No.: 12/219,738

(22) Filed: Jul. 28, 2008

(65) Prior Publication Data
US 2009/0085352 A1    Apr. 2, 2009

(30) Foreign Application Priority Data
Sep. 27, 2007    (JP) ................. 2007-252429

(51) Int. Cl.
F02D 31/00    (2006.01)
F02D 35/00    (2006.01)
F02D 29/06    (2006.01)
H02P 9/04    (2006.01)

(52) U.S. Cl. .............. 290/40 A; 290/40 C; 290/40 F; 290/7; 290/24

(58) Field of Classification Search ............ 290/40 A, 290/40 C, 40 F, 24, 7
See application file for complete search history.

(56) References Cited

U.S. PATENT DOCUMENTS

| | | | | |
|---|---|---|---|---|
| 3,625,054 A | * | 12/1971 | Vesper et al. | 73/114.17 |
| 5,255,175 A | * | 10/1993 | Uchino | 363/81 |
| 5,543,703 A | * | 8/1996 | Kusase et al. | 322/16 |
| 5,880,533 A | * | 3/1999 | Arai et al. | 290/31 |
| 5,988,137 A | * | 11/1999 | Tamura et al. | 123/295 |
| 6,252,381 B1 | * | 6/2001 | Schenk | 322/28 |
| 6,429,539 B1 | * | 8/2002 | Suzuki et al. | 290/40 A |
| 6,713,888 B2 | * | 3/2004 | Kajiura | 290/40 F |
| 6,894,402 B2 | * | 5/2005 | Dubus et al. | 290/40 C |
| 7,034,412 B2 | * | 4/2006 | Kuribayashi | 307/9.1 |
| 7,061,132 B2 | * | 6/2006 | Toyoda et al. | 290/40 C |
| 7,514,807 B2 | * | 4/2009 | Donnelly et al. | 290/40 C |
| 7,936,149 B2 | * | 5/2011 | Ohnuki | 320/119 |
| 2002/0074803 A1 | * | 6/2002 | Kajiura | 290/40 F |
| 2004/0150233 A1 | * | 8/2004 | Kajiura | 290/24 |
| 2008/0084184 A1 | * | 4/2008 | Ohnuki | 320/116 |
| 2009/0020092 A1 | * | 1/2009 | Kishibata et al. | 123/179.3 |
| 2009/0079190 A1 | * | 3/2009 | Saito et al. | 290/7 |
| 2010/0000492 A1 | * | 1/2010 | Ambardekar | 123/245 |

FOREIGN PATENT DOCUMENTS

| | | |
|---|---|---|
| JP | 03-212200 | 9/1991 |
| JP | 3-504407 | 9/1991 |

* cited by examiner

Primary Examiner — Pedro J Cuevas
(74) Attorney, Agent, or Firm — Squire, Sanders & Dempsey (US) LLP (57) ABSTRACT

A power generation control device can include a switching circuit which controls an output of a generator. A periodical power charge control unit can be configured to allow the switching circuit to the operated in a zone including a combustion stroke of one cylinder of an internal combustion engine, and in an periodical power charge control range preset from in a zone which does not overlap a compression stroke of another cylinder of the internal combustion engine.

14 Claims, 4 Drawing Sheets

Fig.6

POWER GENERATION CONTROL DEVICE

BACKGROUND OF THE INVENTION

1. Field of the Invention

The present invention relates to a power generation control device, and more particularly to a power generation control device which performs a control such that an output current of a generator of an engine is supplied to a battery or a load only in a preset zone in which a friction of the engine is small.

2. Description of the Related Art

A vehicle driven by an engine such as a motorcycle or a four-wheeled vehicle can include a generator driven by the engine, and a battery which supplies electric power used by the vehicle is charged with an output current of the generator. Further, in general, the vehicle-mounted generator is also used as a motor for starting the engine.

There has been known that a quantity of generated electric power generated by the vehicle-mounted generator is variably controlled corresponding to a load of the engine. For example, JP-T-3-504407 (JP '407) proposes an AC generator battery charging method which stops a power generation function when a battery voltage reaches a predetermined level, wherein the method can, when a large load is applied to the engine, prevent lowering of efficiency of the engine by stopping or reducing a power generation function of an AC generator even when a battery is not charged to the predetermined level.

Further, JP-A-3-212200 (JP '200) proposes a control device which controls a field wiring current corresponding to an electric load state or an operation state of an automobile when the control device is applied to the automobile, wherein a field current of a generator is controlled at the time of occurrence of knocking and stops the field current.

SUMMARY OF THE INVENTION

In one embodiment, the invention includes device comprising a switching circuit which controls an output of a generator. A periodical power charge control means which allows the switching circuit to be operated in a zone including a combination stroke of one cylinder of an internal combustion engine, and in a periodical power charge control range preset in a zone which does not overlap a compression stroke of another cylinder of the internal combustion engine.

In another embodiment, the invention includes a device comprising a switching circuit configured to control an output of a generator, and a power charge control unit. The unit is configured to enable the switching circuit to operate in a zone including a combustion stroke of one cylinder of an internal combustion engine, and in an periodical power charge control range which is preset in a zone which does not overlap with a compression stroke of another cylinder of the internal combustion engine.

In another embodiment, the invention includes a method which comprises providing a switching circuit for controlling an output of a generator. The method also includes controlling the generator to the operated in a zone including a combustion stroke of a cylinder of an internal combustion engine, and only in a range which is preset not to overlap with a compression stroke of another cylinder of the internal combustion engine.

DETAILED DESCRIPTION OF THE PREFERRED EMBODIMENTS

In the conventional power generation control device or charge control device described, for example, in JP '407 or JP '200, when a load is large, the load of the engine can be reduced by limiting a quantity of generated electric power. On the other hand, the 4-cycle engine differs in internal friction (a force which acts in the direction opposite to the direction that a piston moves in terms of the function of the engine during an operation of the engine) depending on the respective cycles or strokes and, therefore, even when the quantity of generated electric power is simply controlled based on only a state of a load applied to the whole engine without taking the friction into consideration, it can be difficult to reduce the fluctuation of torque attributed to the difference in friction between strokes.

When the engine is driven in a low rotational speed region, the overall output torque is small and, therefore, even when the quantity of generated electric power is limited, there may be a case that the rotation of the engine lacks smoothness due to the fluctuation of torque attributed to the difference in the friction between the respective strokes. Even when the quantity of generated electric power is controlled based on only a general load state, there may be a case that the smoothness of the engine rotation cannot be notably improved.

Accordingly, embodiments of the present invention can provide a power generation control device which can perform smoothing of a torque particularly in a low rotational speed region by controlling a quantity of generated electric power by taking a friction in respective strokes into consideration.

Figure 1:
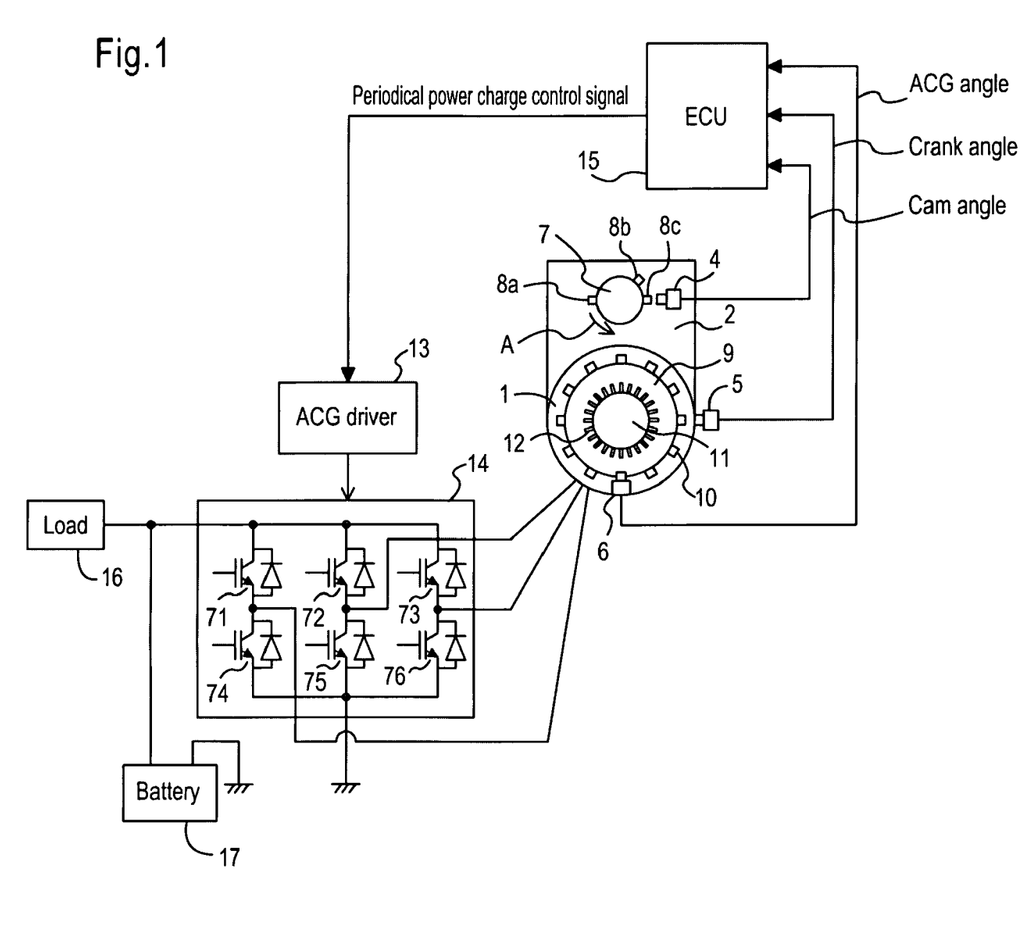
FIG. 1 illustrates a system constitutional view of a power charge control device according to one embodiment of the present invention.

Hereinafter, one embodiment of the present invention is explained in conjunction with drawings. FIG. 1 is a view showing the system constitution of a charge control device according to one embodiment of a power generation control device of the present invention. In FIG. 1, a generator 1 driven by an engine 2 outputs a three-phase alternating current. The outputted three-phase alternating current is converted into a direct current, and the direct current is supplied to a load 16 and a battery 17.

The engine 2, in one embodiment, is a so-called V-type 2-cylinder 4-cycle engine in which two cylinders are arranged with, for example, a relative angle of 52° formed therebetween. Here, the relative angle formed between two cylinders is not limited to 52°, and may be set to any arbitrary angle. The generator 1 may preferably be of a type in which an inner rotor having a rotor magnet is connected to a crankshaft of the engine 2, and a generation output is obtained from a three-phase wiring of an outer stator arranged on an outer peripheral side of the inner rotor, that is, of an inner-rotor/outer-stator type. However, a type of the generator 1 is not limited to the above-mentioned type.

A cam angle sensor 4 for detecting a cam angle and a crank angle sensor 5 for detecting a crank angle are mounted on the engine 2, and an ACG angle sensor 6 for detecting a rotational angle of the generator 1 (hereinafter referred to as an "ACG angle") is mounted on the generator 1.

The cam angle sensor 4 can be arranged to face three detection portions 8a, 8b, 8c mounted in a projecting manner on a periphery of a rotary member 7 connected to a camshaft (not shown in the drawing) of the engine 2, and can output a cam angle signal which is changed each time the detection portion 8a, 8b, 8c is detected. A relative angle formed between the detection portions 8a and 8c is set to 180°, and the detection portion 8b is arranged between the detection portions 8a and 8c. A position of the detection portion 8a and a position of the detection portion 8c are set such that an exhaust top dead center, that is, an overlap top of one cylinder out of two cylinders (hereinafter, referred to as a "second cylinder"), is arranged between the detection portions 8b and 8c.

Due to such an embodiment, when the rotary member 7 is set such that the rotary member 7 is rotated in the direction indicated by an arrow A, the cam angle sensor 4 outputs the detection signals of the detection portions 8a, 8b, 8c in this order. In the 4-cycle engine, the rotary member 7 which is mounted on a cam shaft is configured to perform one rotation for two rotations of the crankshaft and, therefore, the relative angle of 180° formed between the detection portions 8a and 8b corresponds to a crank angle of 360°.

The crank angle sensor 5 is arranged to face detection portions 10 mounted in a projecting manner on a periphery of a rotary member 9 connected to the crankshaft. The crank angle sensor 5 can output a crank angle signal which is changed every time one of the plurality of detection portions 10 is detected along with the rotation of the rotary member 9. Although the detection portions 10 are arranged on the rotary member 9 at intervals of 30°, a tooth missing portion where the detection portion 10 is not formed is formed on only one portion of the periphery of the rotary member 9. Accordingly, the interval between the detection portions 10 is set to a wide interval of 60° at this portion. That is, the interval between the detection signals at two detection portions 10 which sandwich the tooth missing portion is set to be larger than other intervals.

The ACG angle sensor 6 can be arranged to face detection portions 12 mounted in a projecting manner on a periphery of a rotor 11 of the generator 1, and can output an ACG angle signal which is changed every time one of the detection portions 12 is detected. The detection portions 12 are arranged on the rotor 11 at an interval of, for example, 15°.

Here, the cam angle sensor 4, the crank angle sensor 5 and the ACG angle sensor 6 are not limited to sensors which output signals changed corresponding to the presence or the non-presence of the projecting detection portions 8a to 8c, 10, 12, and may be formed of sensors which output detection signals in response to sensor-use magnets arranged at intervals substantially equal to the intervals of the projecting detection portions 8a to 8c, 10, 12 while having polarities different from each other.

An ACG driver 13 can control an output of the generator 1 by controlling a switching circuit 14 provided to the generator 1. The switching circuit 14 can include a three-phase bridge circuit formed of FETs 71 to 76. The switching circuit 14 rectifies an output alternating current of the generator 1 by switching these FETs and, at the same time, controls an output voltage by performing a duty control which changes power supply phases of the FETs.

The output of the generator 1 controlled by the switching circuit 14 is connected to the load 16 and the battery 17. The ACG driver 13 determines an ON time (duty) of the FETs 71 to 76 corresponding to a residual quantity of charge in the battery 17 or a load state. For example, when the residual quantity of charge in the battery 17 is small or when the load is large, the ACG driver 13 performs a control to increase the duty.

The cam angle signal, the crank angle signal and the ACG angle signal can be inputted to an ECU 15. The ECU 15 performs the determination of cylinder in response to the cam angle signal and, at the same time, performs the determination of stroke based on the crank angle signal and the cam angle signal. Further, the ECU 15 detects an engine rotational speed Ne based on the crank angle signal and, at the same time, detects an FI-IG state (hereinafter, simply referred to as a "stage") for determining the fuel injection and the ignition timing. Further, the ECU 15 detects the switching timing of the switching circuit 14 in response to the ACG angle signal.

Further, the ECU 15 detects a zone in which a preset friction is small during 4 cycles and outputs a periodical power charge control signal to the ACG driver 13 for performing a power charging operation only in this zone. This periodical power charge is executed when the engine rotational speed Ne is equal to or more than a preset idling rotational speed NeIDL and is equal to or less than a normal power charge start rotational speed NeCH. When the engine rotational speed Ne is equal to or more than the normal power charge start rotational speed NeCH, the power charge is not limited to the zone in which the friction is small but can be also performed in other zones. Further, when the engine rotational speed Ne is less than the idling rotational speed NeIDL, the power charging is not performed.

Figure 2:
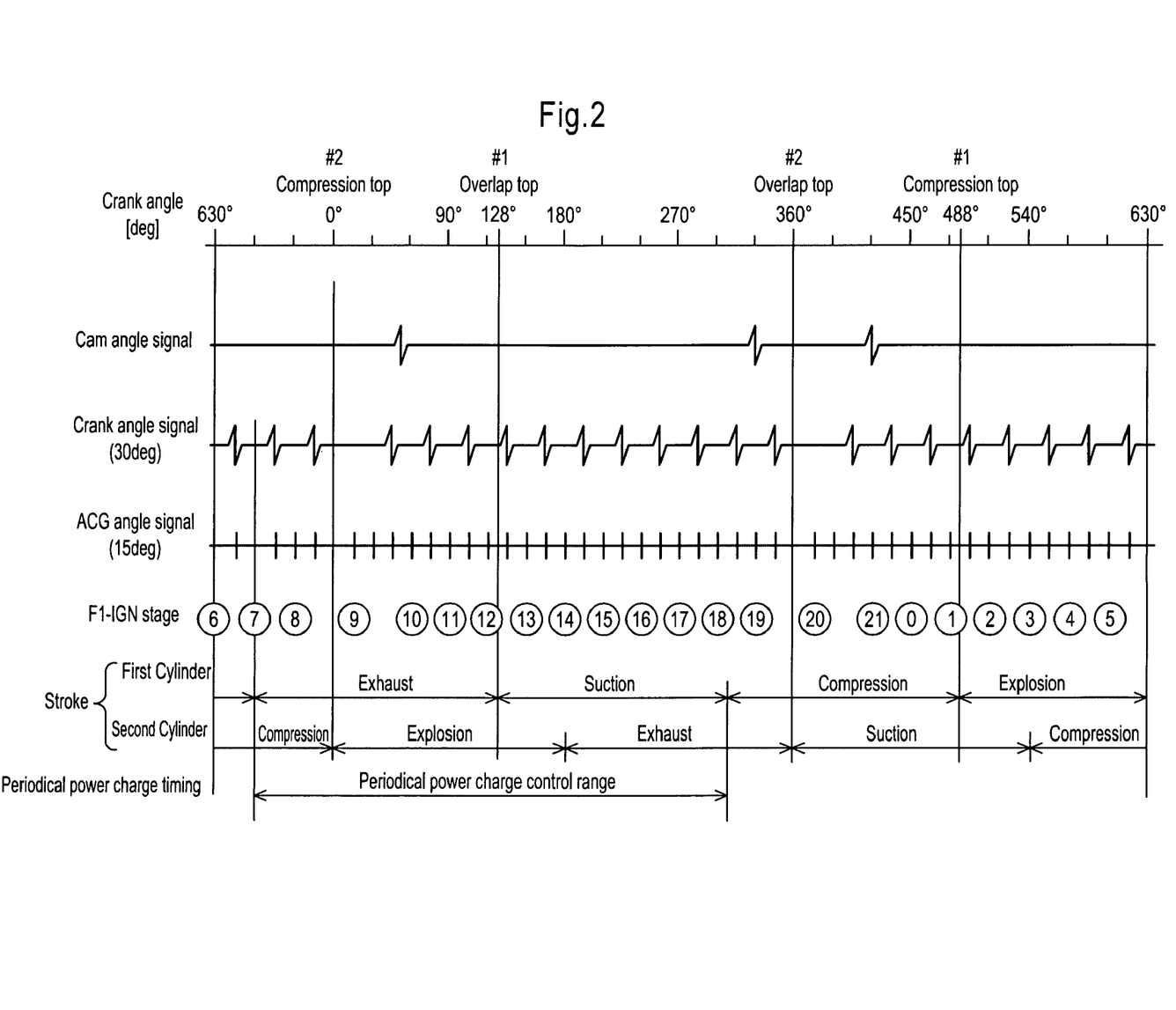
FIG. 2 illustrates a timing chart of a periodical power charge control.

FIG. 2 is a timing chart of a periodical power charge control showing timing for 1 cycle of the engine 2, that is, timing for 4 strokes (for crank rotation or angle of 720°). As described above, the cam angle signal is changed three times in 1 cycle. That is, the cam angle sensor generates three pulse signals each time the crankshaft is rotated two times. The crank angle signal is generated at the interval of 30°. As described above, the crank angle signal is generated at the interval of 60° in the tooth missing portion where the interval between two detection portions is set to be wide. A portion where the interval of the crank angle signals is set wide appears two times in 1 cycle, and one wide portion is arranged to be positioned between two cam angle signals obtained by detection portions 8b, 8c. That is, the relationship between the crankshaft and the cam shaft is set to position the overlap top, that is, the exhaust top dead center of the second cylinder at such a portion, in this example.

The ACG angle signal is generated at an interval of 15° corresponding to the arrangement interval of the detection portions 12.

The explanation is made hereinafter with respect to a method of determining the stage and a method of determining strokes and cylinders based on the cam angle signal, the crank angle signal and the ACG angle signal described above. A program is set to calculate a detection period each time the crank angle signal is detected. This program can be implemented in software, firmware, or implemented in hardware, or any other suitable medium. Then, when the crank angle signal is detected after the detection of the cam angle signal, timing that the ACG angle signal is detected immediately after the detection of the crank angle signal is temporarily set as the second-cylinder overlap top and a predetermined stage number is allocated. Then, when the period between the crank angle signal detected thereafter and the crank angle signal detected immediately before such a crank angle signal is a period corresponding to the crank angle of 30°, the temporary determination is cancelled. On the other hand, when the period between the crank angle signal detected after the temporary determination and the crank angle signal detected immediately before the temporary determination is a period corresponding to the crank angle of 60°, the temporary determination becomes the final determination. Based on the determination of the second-cylinder overlap top and the stage number, the position at which the crankshaft is rotated by 360° is determined as a second-cylinder compression top dead center. The crank angle of 360° is determined based on the detection number of ACG angle signals.

When the second-cylinder compression top dead center and the second-cylinder exhaust top dead center are determined, based on the preset relative relationship between a first-cylinder compression top dead center and a first-cylinder exhaust top dead center and the preset relative relationship between the second-cylinder compression top dead center and the second-cylinder exhaust top dead center, the first-cylinder compression top dead center and the first-cylinder exhaust top dead center are determined.

In the embodiment shown in FIG. 2, a stage between two crank angle signals, that is, the crank angle signal immediately before the first-cylinder compression top dead center and the crank angle signal before the immediately-before crank angle signal, is given a stage number "0".

Based on the compression top center and the exhaust top center of each cylinder determined in the above-mentioned manner, An intake or suction stroke, a compression stroke, a combustion or explosion stroke, and an exhaust stroke of each cylinder are determined as shown in second and third rows from the bottom in FIG. 2. Among these strokes, the AGC driver 13 is controlled to perform power charging only at timing that a friction of the engine is small. That is, the switching circuit 14 is operated by selecting timing at which the friction of the engine is not excessively increased as a whole even a power generation load is applied, and the generated power is connected to the load 16 and the battery 17.

The engine generates a largest force in the combustion stroke among one cycle; therefore, the engine is barely influenced by the load attributed to power generation in the combustion stroke. The exhaust stroke is also barely influenced by the load attributed to power generation. This is because the exhaust stroke carries the inertia generated in the combustion stroke. Since the inertia of the combustion stroke is small in the suction stroke, the influence of the load attributed to power generation is slightly large. In the compression stroke, both of an intake valve and an exhaust valve are closed, and the inertia of the combustion stroke is extremely small; therefore, the stability of the engine rotational speed is most influenced by the load attributed to power generation.

Accordingly, it is preferable to perform the power charging in a zone with the combustion stroke at the center thereof. However, in a 2-cylinder engine according to this example, the combustion stroke appears at two locations and, therefore, it is preferable to select one place out of these two locations. In the example shown in FIG. 2, the combustion stroke of the first cylinder includes a portion which overlaps the suction stroke and the compression stroke of the second cylinder. On the other hand, the combustion stroke of the second cylinder includes a portion which overlaps the exhaust stroke and the intake or suction stroke of the first cylinder. In view of such relationships, to take the influence of the load attributed to power generation into consideration, it is desirable to perform the power charging in the zone including portions before and after the combustion stroke of the second cylinder with the combustion stroke of the second cylinder at the center of the zone.

In view of the above, the zone including the portion of the compression stroke and the portion of the exhaust stroke with the combustion stroke of the second cylinder at the center of the zone is set as a power charging range. This range is referred to as "periodical power charge control range" from a viewpoint that the battery 17 is charged with the power generation output in this range. In the example shown in FIG. 2, a latter half portion of the compression stroke of the second cylinder is included in the periodical power charge control range. However, this latter half portion of the compression stroke overlaps a front half of the exhaust stroke of the first cylinder, and therefore, a large friction of the engine in the compression stroke of the second cylinder is offset by a small friction of the engine in the exhaust stroke of the first cylinder whereby the latter half portion of the compression stroke is a zone where the friction of the engine is relatively small. Further, although the exhaust stroke of the second cylinder is also included in the periodical power charge control range, this exhaust stroke overlaps the suction stroke of the first cylinder and defines a zone where the friction of the engine is small.

In the periodical power charge control range set in this manner, the load attributed to power generation is not applied in the combustion stroke of the first cylinder, and the load attributed to power generation is applied only in the combustion stroke of the second cylinder and, therefore, the combustion of the first cylinder is emphasized compared to the combustion of the second cylinder thus also giving rise to an advantageous effect that a beat feeling of the engine is amplified.

Here, in the example shown in FIG. 2, the interval between the combustion stroke of the first cylinder and the combustion stroke of the second cylinder is 232°. That is, the explosion or mixture combustion of the second cylinder is executed following the explosion of the first cylinder and, thereafter, the crank angle advances by 488° so that the cycle reaches the combustion stroke of the first cylinder. In this manner, the combustion strokes performed two times are offset to one rotation side among two rotations of the engine. However, the displacement between the respective combustion strokes in the first cylinder and the second cylinder is not limited to the above-mentioned angle. Accordingly, a case in which the relationship between the respective strokes differs from the relationship shown in FIG. 2 may be also estimated. However, there is no possibility that the combustion strokes are set to overlap each other. This is because the overlapping of the combustion strokes reduces the smoothness of the rotation of the engine. However, whatever relationship the strokes of two cylinders take, it is desirable that the periodical power charge control range is set to the zone where the total friction of the engine in both cylinders is small, that is, the zone where the combustion stroke of one cylinder and the exhaust and suction strokes of another cylinder overlap each other with the combustion stroke of one cylinder at the center of the zone. The zone which includes at least the explosion stroke of one cylinder and does not overlap the compression stroke of another cylinder is set as the periodical power charge control range.

The periodical power charge control range is not fixed to the zone shown in FIG. 2. The power charge in such a periodical power charge control range is applicable to a case in which the rotational speed of the engine is equal to or more than the idling rotational speed NeIDL and less than the preset normal power charge start rotational speed NeCH. When the rotational speed of the engine is large, the power charge may be performed in all strokes without being limited to the periodical power charge control range. Further, the periodical power charge control range may be shortened immediately after starting the engine or in the range of the small engine rotational speed in the vicinity of the idling rotational speed NeIDL.

Figure 3:
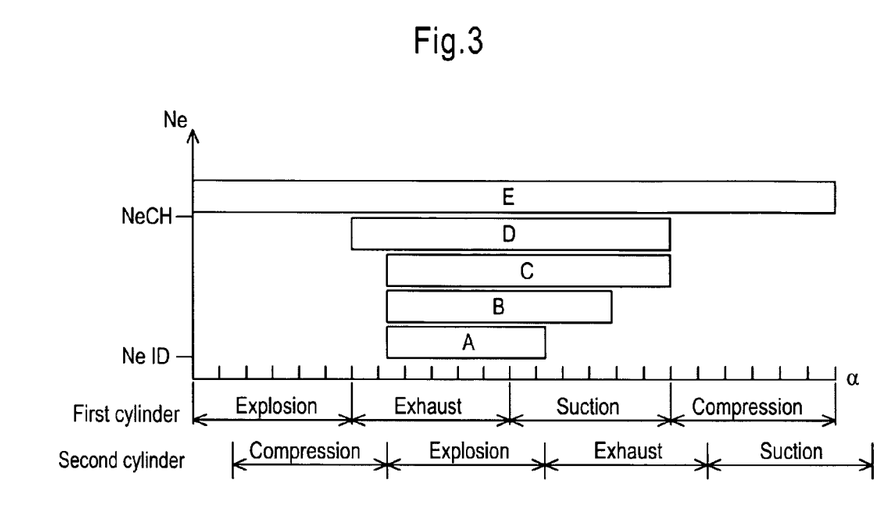
FIG. 3 illustrates a view showing the relationship between an engine rotational speed and a power charge period according to one embodiment of the present invention.

FIG. 3 is a view showing the relationship between the periodical power charge control range and the engine rotational speed. In the drawing, a crank angle α is taken on an axis of abscissas, and the engine rotational speed Ne is taken on an axis of ordinates. With respect to the axis of abscissas, scales are provided at an interval of 30° corresponding to the output of the crank angle sensor 5. The left end of the scales expresses the compression top dead center (top position) of the first cylinder.

Then, the periodical power charge control period, that is, the power generation period which is expressed corresponding to the scales, differs corresponding to the engine rotational speed Ne. Power charge periods A, B, C, D and E are set corresponding to the engine rotational speed Ne. The periodical power charge control period A is set within a range where the combustion stroke of the second cylinder and the exhaust and suction strokes of the first cylinder partially overlap with each other, and the periodical power charge control range B has a start end thereof set equal to a start end of the periodical power charge control range A and has a terminal end thereof extended to a range which slightly advances from the periodical power charge control range A.

The periodical power charge control range C is set such that the periodical power charge control range C is further extended to a position where a terminal end of the periodical power charge control range C falls within a range where the exhaust stroke of the second cylinder and the suction stroke of the first cylinder overlap with each other. Further, the periodical power charge control range D has a start end portion thereof extended to a latter half of the compression stroke of the second cylinder. The periodical power charge control range corresponds to the periodical power charge control range shown in FIG. 2. That is, when the engine rotational speed Ne falls within a range from the preset idling rotational speed NeIDL to the normal power charge start rotational speed NeCH which is preset to a value higher than the idling rotational speed NeIDL, the power charge is performed only in the limited ranges before and after the explosion stroke of the second cylinder including such an explosion stroke among all strokes. Further, in the engine rotational speed region where the engine rotational speed is higher than the normal power charge start rotational speed NeCH, the periodical power charge control is applicable corresponding to a load state or a battery voltage in all strokes E of the engine.

Figure 4:
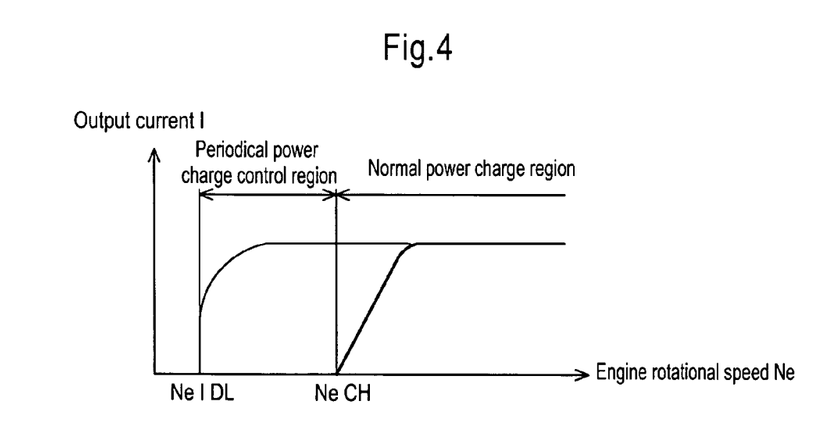
FIG. 4 illustrates an output characteristic chart of a generator.

FIG. 4 is a view showing the basic output characteristic of the generator 1, wherein the engine rotational speed Ne is taken on an axis of abscissas and an output current I of the generator 1 is taken on an axis of ordinates. In the drawing, after starting the engine, the power charge is started at a point of time that the engine rotational speed Ne reaches the idling start rotational speed NeIDL. However, such power charge is not a normal power charge in which the power charge is performed in all strokes and is a periodical power charge in which power charge is performed only in predetermined periodical power charge control ranges explained in conjunction with FIG. 2 and FIG. 3. Then, at a point of time that the engine rotational speed Ne reaches the normal power charge start rotational speed NeCH, the periodical power charge is finished, and the power charge quantity is controlled based on the load state or the battery voltage in all strokes of the engine. That is, the rotational speed range from the idling rotational speed NeIDL to the normal power charge start rotational speed NeCH constitutes a periodical power charge control region, and the rotational speed region equal to or more than the normal power charge start rotational speed NeCH constitutes a normal power charge region.

Figure 5:
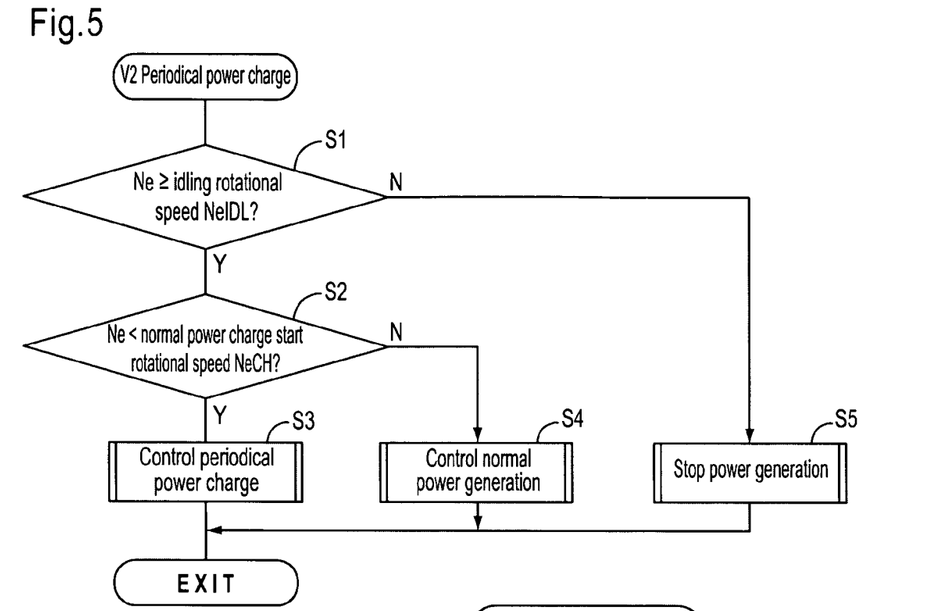
FIG. 5 illustrates a main flow chart of the power charge control device.

FIG. 5 is a main flow chart showing an operation of the power charge control device. In step S1 shown in FIG. 5, it is determined whether or not the engine rotational speed Ne is equal to or more than the idling rotational speed NeIDL. When the engine rotational speed Ne is equal to or more than the idling rotational speed NeIDL, the processing advances to step S2 where it is determined whether or not the engine rotational speed Ne is less than the normal power charge start rotational speed NeCH. When the determination in step S2 is affirmative, that is, when the engine rotational speed Ne is equal to or more than the idling rotational speed NeIDL and less than the normal power charge start rotational speed NeCH, the processing advances to step S3 where the output of the generator 1 is controlled based on the periodical power charge control.

When the determination in step S1 is affirmative and the determination in step S2 is negative, that is, when the engine rotational speed Ne is equal to or more than the idling rotational speed NeIDL and equal to or more than the normal power charge start rotational speed NeCH, the processing advances to step S4 where the normal power generation (power charge) control is performed. That is, the power charge is performed in all strokes of the engine.

When the determination in step S1 is negative, that is, when the engine rotational speed Ne is less than the idling rotational speed NeIDL, the processing advances to step S5 where the power generation (power charge) is stopped.

Figure 6:
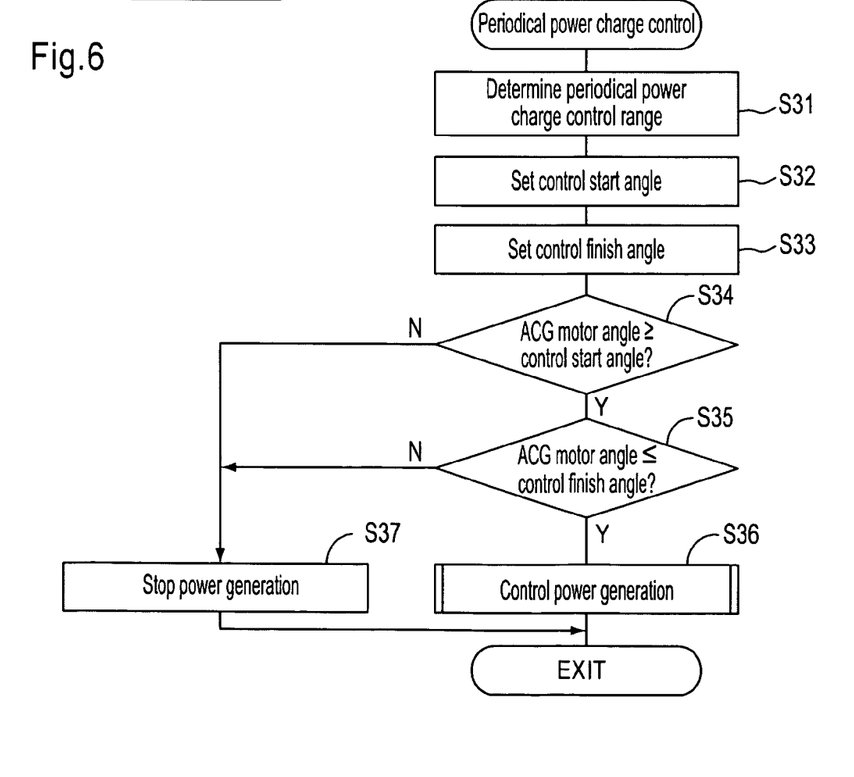
FIG. 6 illustrates a flow chart showing a periodical power charge control.

Next, an operation of an embodiment of the periodical power charge control is explained in conjunction with a flow chart shown in FIG. 6. In step S31, the periodical power charge control range corresponding to the engine rotational speed Ne is determined. The periodical power charge control range may be determined such that a table which preliminarily sets the corresponding relationship between the engine rotational speed Ne and the periodical power charge control ranges A to D is prepared and the periodical power charge control range is determined by applying the current engine rotational speed Ne to the table or may be determined by calculating the periodical power charge control range as a function of the engine rotational speed Ne.

In step S32, a start point (control start angle) of the periodical power charge control range determined in step S31 is set as a value of an ACG angle. In step S33, a finish point (control finish angle) of the periodical power charge control range determined in step S31 is set as an ACG angle. With respect to the ACG angle, the ACG angle detected immediately after the overlap top of the second cylinder, for example, is set as the reference (0°).

In step S34, it is determined whether or not the ACG angle is equal to or more than the control start angle. When the ACG angle is equal to or more than the control start angle, the processing advances to step S35 where it is determined whether or not the ACG angle is equal to or less than the control finish angle. When the ACG angle is equal to or more than the control start angle and equal to or less than the control finish angle, the processing advances to step S36 where the power generation (power charge) control is performed. That is, the periodical power charge control signal is supplied to the ACG driver 13. When the periodical power charge control signal is supplied to the ACG driver 13, a duty control is performed by changing phases of the FETs 71 to 76 of the switching circuit 14 corresponding to a residual quantity of charge in the battery 17 or a state of the load 16 thus performing an output control of the generator 1.

When the ACG angle is less than the control start angle or equal to or more than the control finish angle, there is no periodical power charge control range and, therefore, the processing advances to step S37 and the power generation (power charge) is stopped. That is, the operation of the ACG driver 13 is stopped.

In the above-mentioned embodiment, the strokes of the engine are detected and the preset zone where the friction is considered to be small is set as the periodical power charge control range. However, in addition to setting the periodical power charge control range in the zone where the friction is small, the power charge period may be varied by taking the load state into consideration. For example, a crank angular speed in the preset zone before the compression stroke is detected, and when the crank angular speed is smaller than a reference value based on a detection result, it is determined that the load is large and, therefore, the periodical power charge control range can be shortened.

For example, even in a state that the periodical power charge control range is set to D based on the engine rotational speed, when it is determined that the load is large, the periodical power charge control range D may be changed over with the periodical power charge control range C by shortening the periodical power charge control range D. Further, even in a state that the periodical power charge control range is set to C based on the engine rotational speed, when it is determined that the load is large, the periodical power charge control range may be set to A or B.

According to certain embodiments of the present invention, the power is generated in the preset periodical power charge control range including the explosion stroke with small friction in one cylinder out of two cylinders and in a zone which does not overlap a compression stroke with large friction in another cylinder out of two cylinders, and a load generated by the power generation is added to the friction of the engine per se. Accordingly, the torque can be balanced between the combustion stroke with the small friction and other stroke with the large friction and, therefore, the suction efficiency is stabilized.

According to other embodiments of the present invention, the lower the rotational speed of the engine in a particular region, the periodical power charge control range is shortened. Since the power generation is performed in the explosion stroke with the smaller friction in the region where the rotational speed of the engine is low, it can be possible to perform the minimum power generation while minimizing the influence of a power generation load. Further, by performing the minimum power generation, it is possible to enhance mileage or fuel economy.

According to other embodiments of the present invention, since the periodical power charge control range is limited during the period from the idling rotational speed to the normal power charge start rotational speed, that is, in the region where the rotational speed is comparatively low, particularly, in the low rotational speed region with small torque, it is possible to suppress the increase of the load attributed to the power generation compared to a case when the power is generated throughout all cycles whereby the engine rotation in the low rotational speed region is stabilized.

According to other embodiments of the present invention, the combustion stroke is set closer to the half cycle side of one engine in 1 cycle of the engine and the power generation load is applied to the engine in one explosion stroke and, therefore, the engine rotation becomes more smooth in this combustion stroke. Compared to one combustion stroke, since the power generation load is not applied to the engine in another combustion stroke and, therefore, the comparatively large rotational speed of engine can be maintained whereby the beat feeling of the engine at the time of low rotational speed can be maintained to some extent.

The above-discussed embodiments of the engine are intended to be illustrative only, and are not intended to be limiting in any way. Numerous modifications and changes to the disclosed embodiments can be made, and still remain within the spirit and scope of the invention. For proper determination of the scope present invention, reference should be made to the appended claims.

DESCRIPTION OF REFERENCE NUMERALS AND SIGNS

1: generator
2: engine
4: cam angle sensor
5: crank angle sensor
6: ACG sensor
13: ACG driver
14: switching circuit
17: battery

We claim:

1. A device, comprising:
a switching circuit which controls an output of a generator; and
a periodical power charge control means which allows the switching circuit to be operated in a zone including a combination stroke of one cylinder of an internal combustion engine, and in a periodical power charge control range preset in a zone which does not overlap a compression stroke of another cylinder of the internal combustion engine.

2. A device according to claim 1, wherein the periodical power charge control range is configured to be shifted corresponding to a rotational speed of the engine, and is shifted toward the combustion stroke side of the one cylinder, and is configured to be shortened corresponding to a lowering of the rotational speed of the engine.

3. A device according to claim 1, wherein the periodical power charge control range is effective between a preset idling rotational speed and a normal power charge start rotational speed set at a value higher than the idling rotational speed, and
in an engine rotational speed range equal to or more than the normal power charge start rotational speed, the device is configured to perform a power generation control in a 4-cycle engine in all 4 cycles by operating the switching circuit in all 4 cycles.

4. A device according to claim 1, wherein respective combustion strokes of two cylinders of the internal combustion engine are set closer to a half cycle side of one engine in 1 cycle of the engine.

5. A device according to claim 1, wherein said device comprises a power generation controlled device for a generator driven by the internal combustion engine.

6. A device as recited in claim 5, wherein said internal combustion engine comprises a V-type 2-cylinder 4-cycle engine.

7. A device as recited in claim 1, wherein said device comprises a power generation control device of a generator driven by a V-type 2 cylinder 4-cycle engine.

8. A device, comprising:
a switching circuit configured to control an output of a generator; and
a power charge control unit which is configured to enable the switching circuit to operate in a zone including a combustion stroke of one cylinder of an internal combustion engine, and in an periodical power charge control range which is preset in a zone which does not overlap with a compression stroke of another cylinder of the internal combustion engine.

9. A device according to claim 8, wherein the periodical power charge control range is configured to be shifted to correspond to a rotational speed of the internal combustion engine, and is shifted toward the combustion stroke side of the one cylinder, and is configured to be shortened to correspond to a lowering of the rotational speed of the engine.

10. A device according claim 8, wherein the periodical power charge control range is effective between a preset idling rotational speed and a normal power charge start rotational speed set at a value which is higher than the idling rotational speed, and wherein in an engine rotational speed range which is equal to or more than the normal power charge start rotational speed, the device configured to perform a power generation control in an 4-cycle engine in all four cycles by operating the switching circuit in all 4-cycles.

11. A method, comprising:
providing a switching circuit configured to control an output of a generator;
driving the generator with an internal combustion engine;
controlling the generator to operate in a zone including a combustion stroke of a cylinder of the internal combustion engine, wherein the generator is controlled not to operate in a zone which overlaps with a compression stroke of another cylinder of the internal combustion engine.

12. A method according to claim 11, wherein the operation of the generator is controlled to be shifted to correspond to a rotational speed of the internal combustion engine, wherein the shifting is toward a combustion stroke side of one cylinder, and wherein the generator operation is controlled to be shortened corresponding to a lowering of the rotational speed of the engine.

13. A method according to claim 11, wherein the controlling of the generator comprises operating the switching circuit in all four cycles of a four cycle engine, when the engine is operating in a rotational speed range which is equal to or more than a normal power charged start rotational speed.

14. A method according to claim 11, wherein driving the generator comprises driving the generator with a V-type 2-cylinder 4-cycle engine.

* * * * *